United States Patent
Ramirez, Jr. et al.

(10) Patent No.: US 6,924,612 B2
(45) Date of Patent: Aug. 2, 2005

(54) THREE-WIRE REVERSING SYSTEM

(75) Inventors: Emilio A. Ramirez, Jr., Hanover Park, IL (US); Athanase N. Tsergas, Wood Dale, IL (US)

(73) Assignee: Molon Motor & Coil Corporation, Rolling Meadows, IL (US)

( * ) Notice: Subject to any disclaimer, the term of this patent is extended or adjusted under 35 U.S.C. 154(b) by 0 days.

(21) Appl. No.: 10/728,860

(22) Filed: Dec. 8, 2003

(65) Prior Publication Data

US 2005/0122075 A1 Jun. 9, 2005

(51) Int. Cl.[7] .................................................. H02P 1/00
(52) U.S. Cl. .................... 318/280; 318/368; 318/380
(58) Field of Search ................... 318/280, 368, 318/380, 342, 345; 320/166; 388/800, 816, 817, 819; 307/80

(56) References Cited

U.S. PATENT DOCUMENTS

| | | | |
|---|---|---|---|
| 3,611,894 A | * | 10/1971 | Minneste, Jr. ............... 396/259 |
| 3,670,189 A | | 6/1972 | Monroe |
| 3,697,841 A | | 10/1972 | Nystuen |
| 3,714,534 A | * | 1/1973 | Hoadley ..................... 318/368 |
| 4,282,464 A | | 8/1981 | Uzuka |
| 4,731,570 A | | 3/1988 | Lee |
| 4,823,037 A | | 4/1989 | Abukawa et al. |
| 4,905,300 A | | 2/1990 | Bhagwat et al. |
| 5,130,624 A | | 7/1992 | Bashark |
| 5,241,257 A | | 8/1993 | Nordby et al. |
| 5,495,161 A | | 2/1996 | Hunter |
| 5,703,456 A | | 12/1997 | Cox |
| 5,818,194 A | | 10/1998 | Nordby |
| 6,051,952 A | | 4/2000 | Moreira et al. |
| 2003/0006738 A1 | * | 1/2003 | Duff, Jr. ..................... 320/166 |
| 2003/0071592 A1 | | 4/2003 | Lin |

* cited by examiner

*Primary Examiner*—Karen Masih
(74) *Attorney, Agent, or Firm*—Oblon, Spivak, McClelland, Maier & Neustadt, P.C.

(57) ABSTRACT

A three-wire reversing system for a permanent magnet, reversible, brush-type, direct current (DC) motor has a three-wire alternating current (AC) input voltage source which supplies electrical current to at least one capacitive element. This capacitive element and the DC motor replace a permanent split capacitor (PSC) and an AC motor in a prior art three-wire reversing system.

4 Claims, 1 Drawing Sheet

THREE-WIRE REVERSING SYSTEM

BACKGROUND OF THE INVENTION

1. Field of the Invention

The present invention relates generally to motive electric power systems and, in particular, to a three-wire reversing system for a permanent magnet, brush-type, direct current (DC) motor powered by an alternating current (AC) input voltage.

2. Discussion of the Prior Art

Known motive electric power systems show that the general concept of rectifying or converting an AC voltage input to power a DC motor is well known in the prior art related to DC motor drive systems. There are several examples showing this general concept in the prior art.

U.S. Pat. No. 3,670,189 to Monroe discloses a self-starting permanent magnet-type motor consisting of a fore and an aft stator assembly which will operate on batteries or alternate half cycle current.

U.S. Pat. No. 3,697,841 to Nystuen was issued to Whirlpool Corp. and discloses an induction motor with a squirrel cage rotor and an additional stator winding which, when energized in proper sequence with the original stator winding, causes rapid reversal of the motor.

U.S. Pat. No. 4,282,464 to Uzuka discloses a reversible drive circuit for a brushless DC motor including a rotor, a plurality of magnets, and a stator with at least two coils. The reversible drive circuit regulates an alternating signal through the coils. First and second switching transistors are included for energizing the coils with the alternating signal. However, this brushless DC motor is not usable in the present invention.

U.S. Pat. No. 4,731,570 to Lee discloses an electrical drive circuit for a variable-speed switched reluctance motor with a bifilar winding which may be used as a replacement for conventional induction motor drives to provide good combinations of high output power and system efficiency at considerably lower costs.

U.S. Pat. No. 4,823,037 to Abukawa et al. discloses a DC electric motor comprising: a reversibly rotatable rotor with an armature core; an armature winding and a commutator; a stator having a yoke and a plurality of field poles on an inner circumference of the yoke with each having a permanent magnet and an auxiliary pole; and a plurality of brushes arranged to be slidably electrically conductively in contact with the commutator.

U.S. Pat. No. 4,905,300 to Bhagwat et al. discloses a motor control and power system in which a pulsating DC voltage is developed by a rectifier 86 and is filtered by a capacitor 100 to facilitate application of a relatively smooth enhanced DC voltage to a motor 106 with the charged voltage of the capacitor applied across a series circuit including a rheostat 118, a resistor 126 and the motor 106. Nevertheless, this DC motor cannot be used in the present invention.

U.S. Pat. No. 5,130,624 to Bashark was issued to Whirlpool Corp. and discloses an electronic control for an automatic washing machine including a reversing permanent split capacitor motor.

U.S. Pat. No. 5,241,257 to Nordby et al. discloses a drive system for household appliances in which an electric motor has an AC-DC converter and inverter to supply electrical power to the motor. This AC motor is exemplary of the prior art and not the present invention.

U.S. Pat. No. 5,495,161 to Hunter discloses a speed control for a series universal AC/DC motor which is controlled by switching the phase angle of an AC signal with a triac power switch in response to a motor providing a phase-locked loop velocity control in which a speed command circuit provides a reference frequency corresponding to a selected motor speed.

U.S. Pat. No. 5,703,456 to Cox discloses a power converter and control system for a motor using an inductive load, such as a switched reluctance motor in which a return bus includes an energy storage device. A controller monitors both the inductive load and the energy stored in the storage device for dynamically controlling the current in the inductive load and the voltage on the storage device. Nevertheless, this switched reluctance motor is not usable in the present invention.

U.S. Pat. No. 5,818,194 to Nordby discloses a direct drop-in replacement variable speed blower motor with a neutral input and two hot AC line connections. The blower motor unit senses which input is energized by sensing either voltage or current on at least one of the inputs, selects one of the two reference signals in accordance with which input is energized, and presents the control input of the replacement variable speed motor with the selected reference signal to control the speed of the motor. However, this speed control system cannot be used with the present invention.

U.S. Pat. No. 6,051,952 to Moreira et al. was issued to the Whirlpool Corp. and discloses an electric motor speed and direction controller including a motor control for a single phase induction motor (SPIM) driven by two windings, i.e. a line winding connected to an AC line and a control winding driven by the controller. The SPIM torque, i.e. speed and direction, is controlled by the voltage output for the controller for all speed below the synchronous speed set by the AC line frequency.

U.S. Patent Application Publication No. 2003/0071592 of Lin discloses a controlling device used for an AC and DC driven motor including a converting unit, a voltage stabilizing unit, a phase detecting/controlling unit and a high voltage driving unit.

There is an additional unpatented prior art device about which the inventors are aware: This relevant prior art device is illustrated in FIG. 1. There is a permanent split capacitor PSC electrically connected to a reversible, alternating current (AC) motor. An input voltage source supplies an alternating current of 50 to 60 Hertz (Hz) to a common (COM) lead and to either a lead for clockwise (CW) motor rotation or a lead for counterclockwise (CCW) motor rotation.

This unpatented prior art three-wire system for reversing the direction of rotation of the AC motor is relatively heavy and requires a large package. Also, the prior art AC motor is an induction type with either two poles operating at about 3,450 revolutions per minutes (rpm) or four poles operating at about 1,675 rpm.

Despite the developments of the prior art, no simple and efficient three-wire reversing motive electric power system has been developed to drive a reversible, permanent magnet, brush-type DC motor using an AC power supply. This type of DC motor may be used to replace the prior art reversible AC-type motor, such as that shown in FIG. 1, and commonly found in household appliances or the like.

SUMMARY OF THE INVENTION

The present invention relates to a three-wire reversing system used to control a reversible, permanent magnet, brush-type, DC motor powered by an AC input voltage.

An object of the present invention is to provide a unique and simple three-wire reversing circuitry for controlling and reversibly driving a reversible, permanent magnet, brush-type, DC motor using an AC voltage source.

Another object of the present invention is to provide a lightweight and efficient three-wire reversing circuitry using a pulsating, AC drive voltage which passes through rectifying diodes and capacitive filter elements to drive a reversible, permanent magnet, brush-type, DC motor that may replace a known AC-type motor, such as that commonly used in household appliances.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings.

DETAILED DESCRIPTION OF THE PREFERRED EMBODIMENTS

Figure 1:
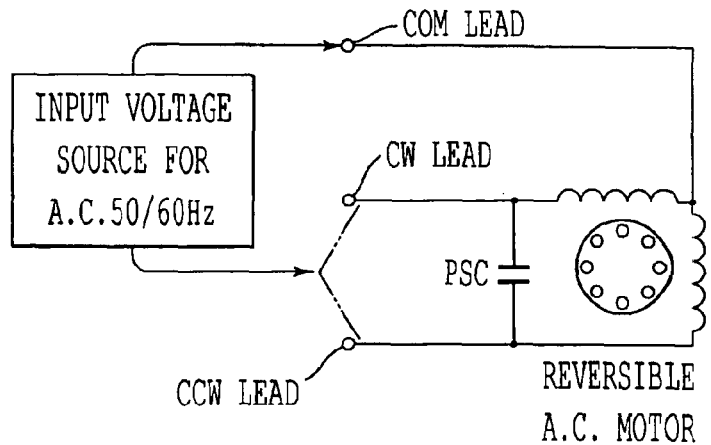
FIG. 1 is a schematic view of a prior art circuit.
Figure 2:
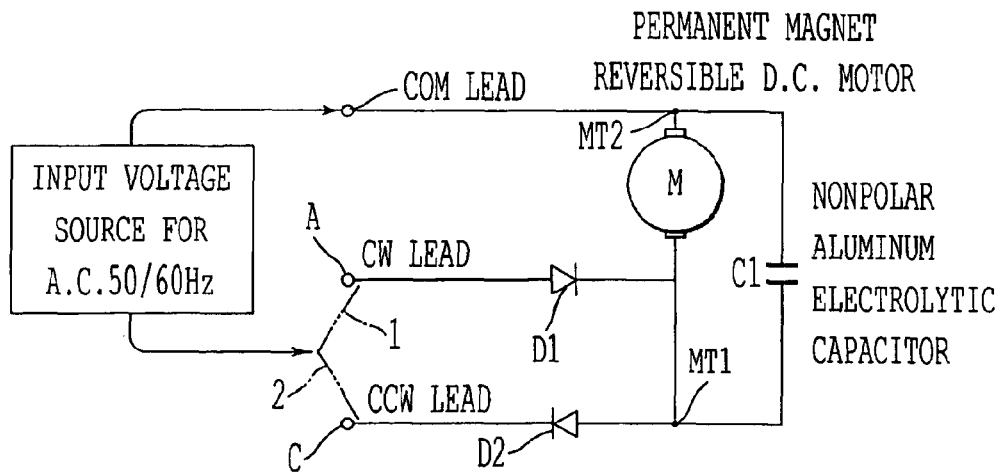
FIG. 2 is a schematic view of a first preferred embodiment of the circuit which comprises the present invention.
Figure 3:
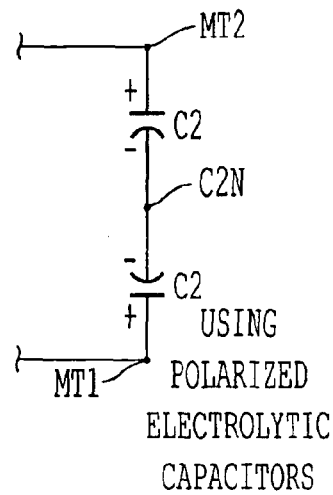
FIG. 3 is a partial schematic view of a second preferred embodiment of the circuit which comprises the present invention.

Referring now to the drawings, wherein like reference numerals designate identical or corresponding parts throughout the several views, and more particularly to FIGS. 2 and 3 thereof, other features of the invention will become apparent in the course of the following descriptions of two exemplary preferred embodiments which are given for illustration of the invention and which are not intended to be limiting thereof.

In FIG. 2, a preferred first embodiment of the subject invention includes a nonpolar, aluminum, electrolytic capacitor C1 connected in parallel across terminals MT1 and MT2 of a permanent magnet, reversible, brush-type, DC motor M. A first diode D1 is connected between a first motor terminal MT1 and a clockwise (CW) lead having an anode A. A second diode D2 is connected between a counterclockwise (CCW) lead and the same first motor terminal MT1. The CCW lead has a cathode C at its end opposite from the second diode D2.

Through a switch in a first position 1, a sinusoidal AC 50/60 Hz input voltage source supplies electrical current to the COM lead which is always in the circuit. Current is also supplied to the anode A and travels through the CW lead and the diode D1 to the DC motor M. When the sinusoidal AC input voltage has crossed the zero line into the negative region, the diode D1 is forward biased into the ON state. The capacitor C1 is charged with and filters the negative voltage applied across motor terminals MT1 and MT2. The negative voltage charged across the capacitor C1 begins to discharge across the terminals MT1 and MT2 of the DC motor M. As a result, a pulsed negative DC voltage is applied across the terminals MT1 and MT2 of the DC motor M to drive the motor M in a clockwise direction. When the sinusoidal AC input voltage has crossed the zero line into the positive region, the diode D1 is reverse biased into the OFF state.

As stated in the previous paragraph, the sinusoidal AC 50/60 Hz input voltage source is connected to the common (COM) lead always in the circuit. Through the switch in a second position 2, the voltage source supplies electrical current to the cathode C. The current travels through the CCW lead and the diode D2 to the DC motor M. When the sinusoidal AC input voltage has crossed the zero line into the positive region, the diode D2 is forward biased into the ON state. The capacitor C1 is charged with and filters a positive voltage applied across the terminals MT1 and MT2. The positive voltage charged across the capacitor C1 begins to discharge across the terminals MT1 and MT2 of the DC motor M. As a result, a pulsed positive DC voltage is applied across the terminals MT1 and MT2 of the DC motor M to drive the DC motor M in a counterclockwise direction. When the sinusoidal AC input voltage has crossed the zero line into the negative region, the diode D2 is reverse biased into the OFF state.

In an alternate second embodiment shown in FIG. 3, the nonpolar aluminum electrolytic capacitor C1 of FIG. 2 is replaced by two polarized electrolytic capacitors C2 connected to one another in series at their common negative terminal C2N. The positive motor terminals MT1 and MT2 are located at opposite ends of each of the capacitors C2. The rest of this alternate embodiment for the three-wire reversing system has the same structure and functions in the same manner as described in regard to the preferred embodiment of FIG. 2. Therefore, the remainder of the second embodiment is neither shown nor described.

To prove the operability of the invention, a prototype was built and tested pursuant to ISO 9000 Section 4.4. The test yielded the following data when 120 volts were applied to the first embodiment of the capacitive element and the DC motor M shown in FIG. 2 with the switch first in position 1 and then in position 2 to cause rotation in the clockwise (CW) and the counterclockwise (CCW) directions, respectively.

| Rotation Direction | CW | CCW |
|---|---|---|
| No Load R.P.M. Speed | 38.00 | 39.00 |
| No Load Amps | 00.19 | 00.20 |
| No Load Watts | 11.40 | 12.40 |
| Full Load R.P.M. Speed | 16.00 | 16.20 |
| Full Load Amps | 01.20 | 01.10 |
| Full Load Watts | 87.00 | 88.00 |
| Stall in Inch-Pounds | 200+ | 200+ |

For the motor embodiment with the switch in the first position, a positive temperature coefficient (PTC) resistor (not shown) switches off the motor M at 90 inch-pounds in ambient temperature when a full load is applied, thus causing the motor M to stop. The motor M was tested for switching time with a locked rotor at ambient temperature when a full load of 90 inch-pounds was applied and was automatically switched off by the PTC resistor (not shown) after only five or six seconds in each test.

Advantages of the present invention over the prior art are several. One advantage is that the three-wire reversing system using the DC motor can be operated at speeds varying from about 2,000 to 20,000 rpm whereas the prior art system using the AC motor has its AC motor operated at speeds of either 1,675 or 3,450 rpm. Also, the three-wire reversing system using the DC motor is lightweight and needs only a small package while the prior art system using the PSC and the AC motor is heavy and requires a large package. Furthermore, the present three-wire reversing system with the DC motor can handle a voltage ranging from a low of 12, 24 or 48 volts to a high of 120 or even 230 volts rectified. At the higher voltages, an operator can increase the number of cycles without losing speed. On the other hand, the prior art system with its AC motor loses speed at these higher voltages. Thus, the three-wire system using the DC motor is more powerful and operates a higher efficiency than the prior art system using the PSC and the AC motor.

Certainly, numerous modifications and variations of the present invention are possible in light of the above teachings. Therefore, it is to be understood that, within the scope of the appended claims, the invention may be practiced in ways other than as specifically described herein.

We claim:

1. A three-wire reversing system comprising:
   a capacitive element;
   a permanent magnet, reversible, brush-type, direct current motor electrically connected to the capacitive element, said motor having first and second terminals;
   a first diode having an anode connected to a first switch lead for clockwise rotation of the motor, said first diode being connected to the first terminal of the motor;
   a second diode having a cathode connected to a second switch lead for counterclockwise rotation of the motor, said second diode being connected to the first terminal of the motor;
   a common lead connected to the second terminal of the motor; and
   an alternating current input voltage source electrically connected to the common lead and selectively connected to one of the first switch lead and the second switch lead.

2. A three-wire reversing system, according to claim 1, wherein the capacitive element is a nonpolar, aluminum, electrolytic type of capacitor.

3. A three-wire reversing system, according to claim 1, wherein the capacitive element includes two polarized electrolytic capacitors connected to one another in series at a common negative terminal.

4. A three-wire reversing system, according to claim 1, wherein the capacitive element is connected in parallel across the first and second terminals of the motor.

* * * * *